United States Patent [19]

Morrow et al.

[11] Patent Number: 5,355,694
[45] Date of Patent: Oct. 18, 1994

[54] MOBILE COOLER

[76] Inventors: Thomas R. Morrow; Carole G. Travers, both of Route 4, P.O. Box 632, Enfield, N.H. 03748

[21] Appl. No.: 49,367

[22] Filed: Apr. 21, 1993

[51] Int. Cl.⁵ .............................................. B60H 1/32
[52] U.S. Cl. ................................. 62/244; 62/457.7
[58] Field of Search ................. 62/244, 457.7, 410, 62/411

[56] References Cited

U.S. PATENT DOCUMENTS

| | | | |
|---|---|---|---|
| 3,043,116 | 7/1962 | Fuller | 62/244 |
| 3,159,090 | 12/1964 | Schutt | 454/292 X |
| 3,164,971 | 1/1965 | Gentz | 62/244 X |
| 3,505,830 | 4/1970 | Koerner | 62/244 X |
| 3,916,639 | 11/1975 | Atkinson | 62/244 X |
| 4,936,103 | 6/1990 | Newman | 62/244 X |
| 5,181,555 | 1/1993 | Chruniak | 62/244 X |
| 5,203,833 | 4/1993 | Howell | 62/244 X |

*Primary Examiner*—William E. Tapolcal

[57] ABSTRACT

The present invention relates to containers cooled by air from a vehicle air conditioning system and more particularly to such containers especially adapted for use in a commercial van utilized for the delivery of perishable foods over considerable distances. In this invention, means are provided internally of such containers to enhance the velocity and to control the direction of the air flow around and over the food contained therein, and to selectively direct and control exhaust air therefrom.

2 Claims, 4 Drawing Sheets

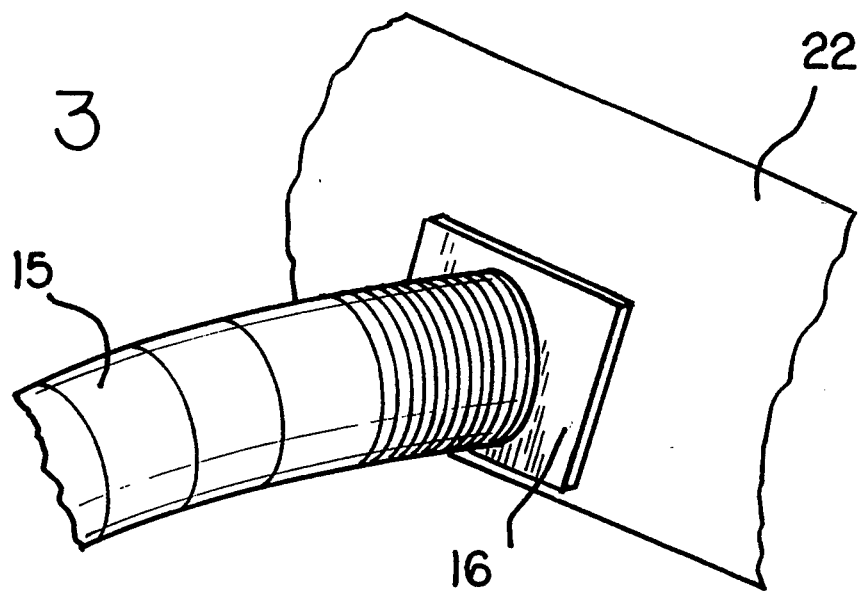
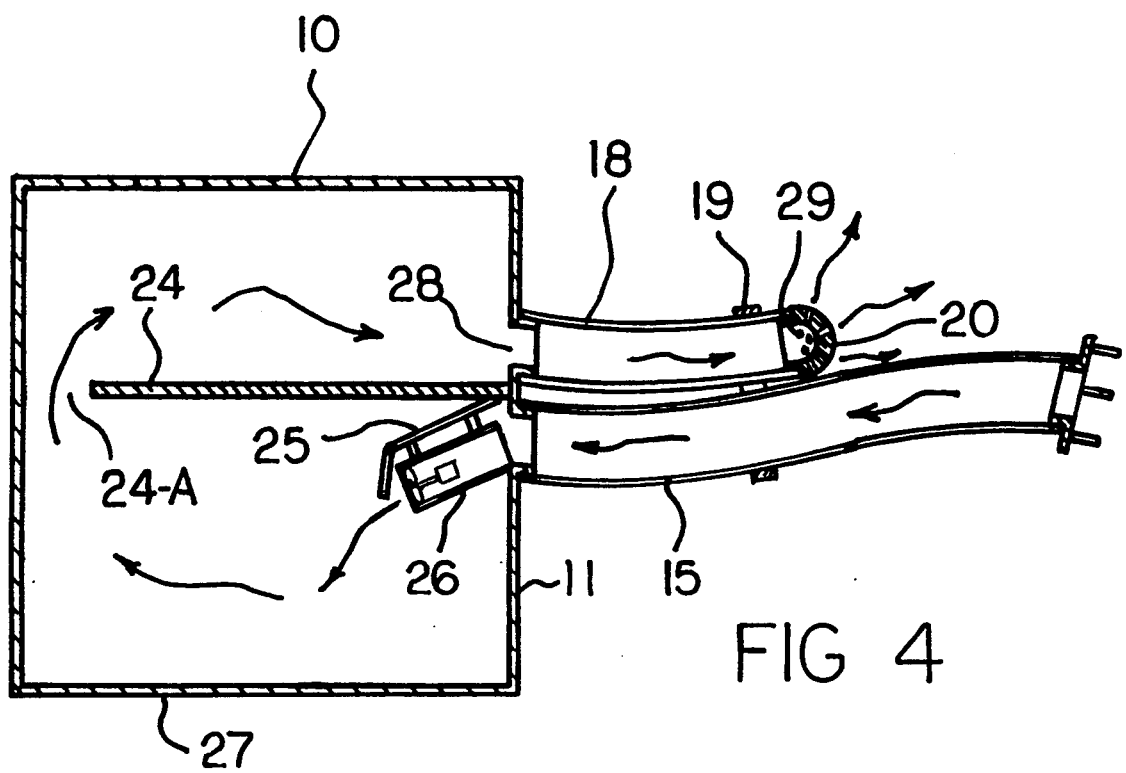

MOBILE COOLER

BACKGROUND OF THE INVENTION

1. Field of the Invention

The present invention relates to mobile coolers and more particularly pertains to such devices which may be connected to the air conditioning system of a vehicle.

2. Description of the Prior Art

The use of mobile coolers is known in the prior art. More specifically, coolers connected to the air conditioning systems of vehicles heretofore devised and utilized for the purpose of keeping perishables fresh are known to consist basically of familiar, expected and obvious structural configurations, notwithstanding the myriad of designs encompassed by the crowded prior art which have been developed for the fulfillment of countless objectives and requirements. The most pertinent art appears to be U.S. Pat. Nos. 4,478,052 and 3,505,830. U.S. Pat. No. 4,478,052 is directed to a tubular beverage cooler connected to an automobile air conditioning system designed to clip onto the door of the vehicle. U.S. Pat. No. 3,505,830 discloses a picnic type cooler also tied-into the vehicle air conditioning system. Both of these references depend entirely upon the velocity and direction of flow of air imposed by the vehicle air conditioning system. In consequence the rate of air movement and the direction thereof is generally not suitable for uniformly cooling the interior of a fairly large container having one or more shelves for supporting perishable foods such as sandwiches thereon.

In this respect, the cooler according to the present invention substantially departs from the conventional concepts and designs of the prior art, and in so doing provides an apparatus primarily developed for the purpose of being placed in a van to handle perishables in commercial quantities.

Therefore, it can be appreciated that there exists a continuing need for new and improved mobile coolers which can be used commercially, In this regard, the present invention substantially fulfills this need.

SUMMARY OF THE INVENTION

In view of the foregoing disadvantages inherent in the known types of mobile coolers now present in the prior art, the present invention provides an improved cooler construction wherein the same can be utilized to protect perishable foods in transit in a commercial operation. As such, the general purpose of the present invention, which will be described subsequently in greater detail, is to provide a new and improved mobile cooler apparatus and method which has all the advantages of the prior art coolers and none of the disadvantages.

To attain this, the present invention essentially comprises a cooler having a hinged and latched door on one side thereof and internal means to increase and direct air flow therein with the air being supplied directly from a vehicle air conditioning system. Further means are provided to exhaust used air from the cooler in both controlled amounts and in variable directions.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved mobile cooler which has all the advantages of the prior art coolers and none of the disadvantages.

It is another object of the present invention to provide a new and improved mobile cooler which may be easily and efficiently manufactured and marketed.

It is a further object of the present invention to provide a new and improved mobile cooler which is of a durable and reliable construction.

An even further object of the present invention is to provide a new and improved mobile cooler which is susceptible of a low cost of manufacture with regard to both materials and labor, and which accordingly is then susceptible of low prices of sale to the consuming public, thereby making such units economically available to the buying public.

Still yet another object of the present invention is to provide a new and improved mobile cooler for attachment to a vehicle air conditioning system which provides in the apparatuses and methods of the prior art some of the advantages thereof, while simultaneously overcoming some of the disadvantages normally associated therewith.

Still another object of the present invention is to provide a new and improved mobile cooler especially adapted for use in commercial side-door vans.

Yet another object of the present invention is to provide a new and improved means for the preservation of perishable foods in transit in a commercial operation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a perspective view of the connection to the vehicle air conditioning vent.

FIG. 4 is a sectional side view taken on line 4—4 of FIG. 1.

DESCRIPTION OF THE PREFERRED EMBODIMENT

Figure 1:
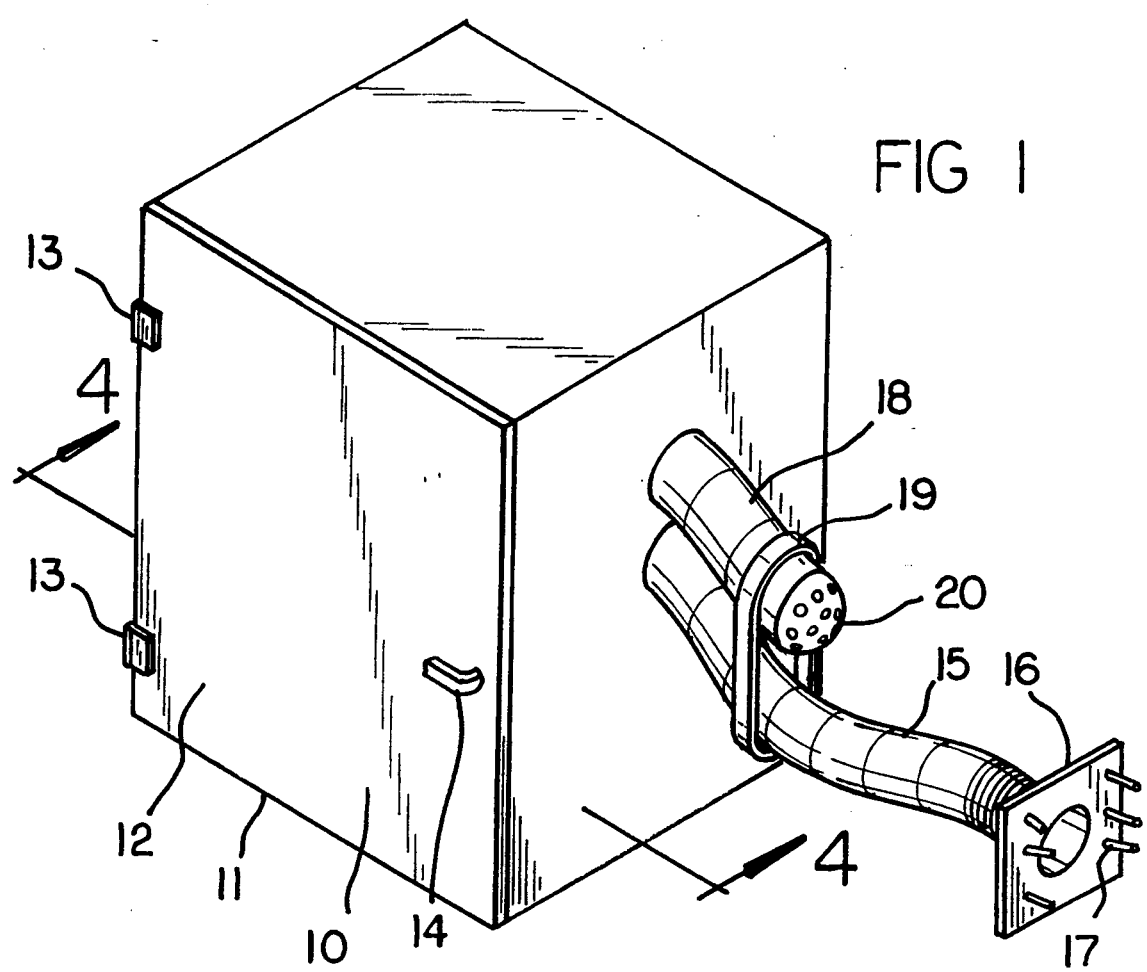
FIG. 1 is a perspective view of the exterior of the device of the present invention before installation in a vehicle.

With reference now to the drawings, and in particular to FIG. 1 thereof, a new and improved mobile cooler embodying the principles and concepts of the present invention and generally designated by the reference numeral 10 will be described.

The cooler container 10 of the present invention is a square or rectangular enclosed box having insulated walls 11 on all sides thereof. Container 10 is provided on one side thereof with a door 12 comprising the entire side 11 thereof except for the frame of the container 10. Affixed to one side of such door 12 and also to the frame of container 10 are a pair of hinges 13 which permit door 12 to swing completely open. At the other side of door 12 is a latch and actuator therefor 14. Such latch may be of a conventional cupboard type or otherwise so long as it secures the door 12 in closed relationship to the container 10 and permits of opening thereof when desired. Shown extending into the container 10 is a section of flexible, hollow intake duct or hose 15. The other end of hose 15 terminates in a plate 16 adapted to fit over and in engagement with the interior vent of a vehicle air conditioner. Means to hold such plate 16 against the vent may vary but as shown here, a plurality of flexible fingers 17 are provided to extend into spring engagement with the vanes normally used in such air conditioning vents. Obviously, tape, adhesive or other means may be used if desired. Also shown in FIG. 1 is a second flexible duct or hose 18 extending from container 10. This duct 18 is an exhaust means for air from the interior of container 10 and is conveniently strapped to the intake duct 15 by a permanent or temporary strap member 19. The outer end of duct 18 terminates in a perforated cone 20 which will be described in more detail below.

Figure 2:
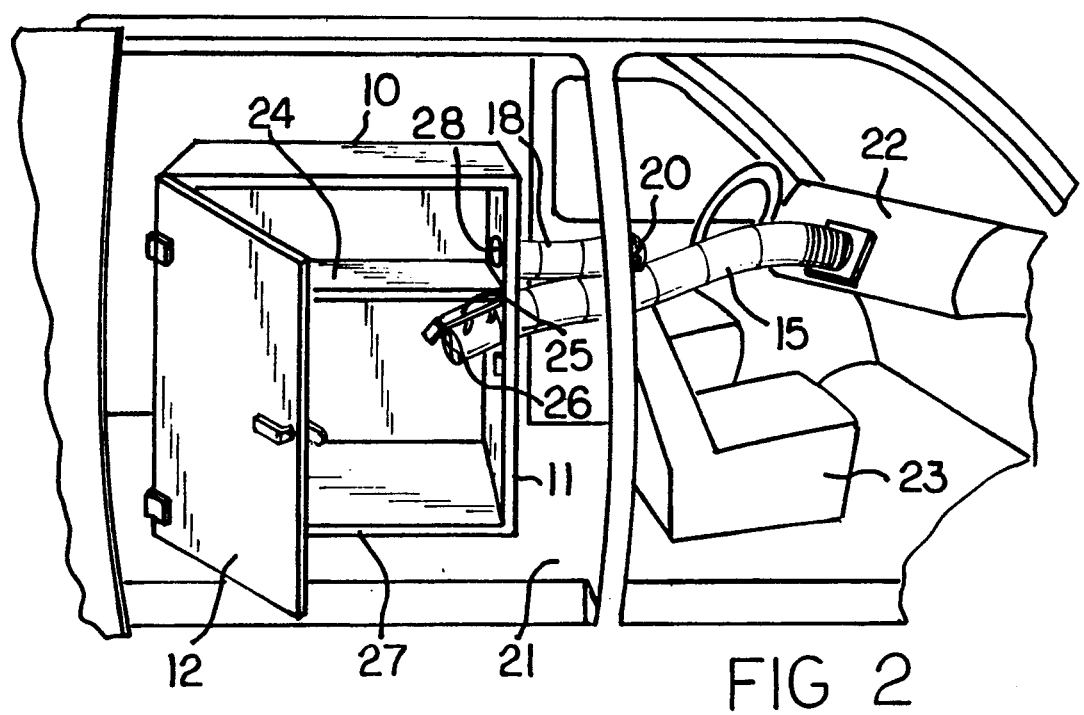
FIG. 2 is a similar view of the invention installed in a vehicle but also showing the interior of the cooler and its associated components.

FIG. 2 illustrates the container 10 and associated duct members 15 and 18 positioned inside of a van body 21. Duct 15 runs from the air conditioning system of the vehicle through attachment at the dash 22 of the vehicle. Duct 15 passes between or over the seats 23 of the van and into container 10. Shown with door 12 of container 10 open, the interior thereof, more fully described in connection with FIG. 4, has therein a food supporting shelf (or shelves) 24, an adjustable angle baffle plate on member 25, and a ducted fan 26 affixed to said baffle member 25.

FIG. 3 show the connection of the duct 15 to vehicle dash 22 by means of plate 16.

FIG. 4 is a sectional view showing details of the interior of container 10 briefly mentioned in connection with the description of FIG. 2. The intake duct 15 enters container 10 through all 11. The walls 11 are shown with their enclosed insulation 27. Adjustable angle baffle member 25 is positioned above and extending downwardly into the path of air travel through duct 15 as it enters container 10. The ducted fan member 26 affixed to baffle member 25 will accelerate the air entering the interior of container 10 while the baffle member 25 will deflect such air down and into container 10 (as shown by the arrows therein). Shelf 24 has an opening 24A at one end thereof to permit the air to flow up and over such shelf 24 and thence into the opening 28 of exhaust duct 18. After passing through duct 18 the air will exhaust through the openings 29 of the conical end perforated cone 20.

Figure 5:
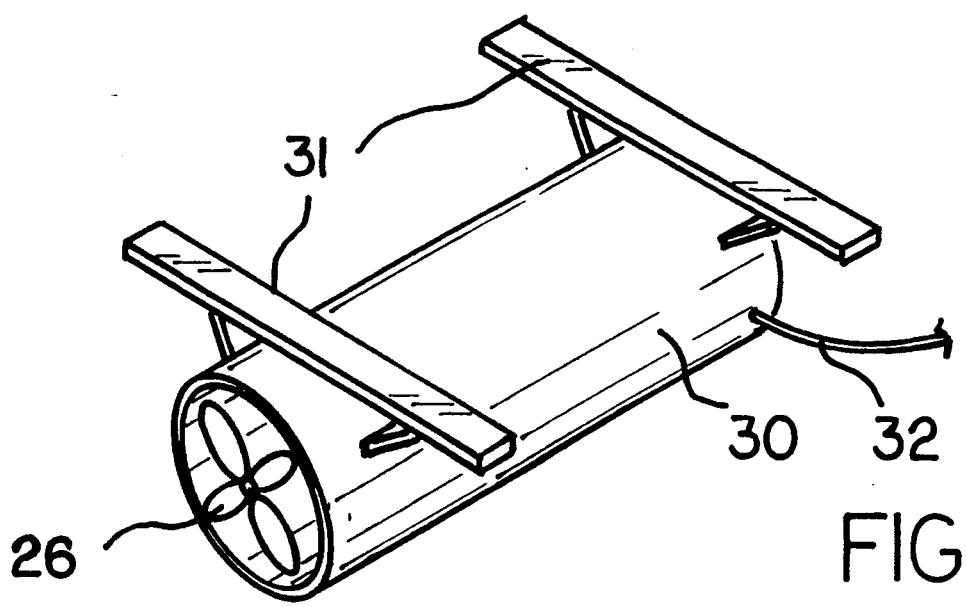
FIG. 5 is a perspective view of the velocity increasing means mounted within the cooler.

FIG. 5 illustrates the ducted fan 26 showing it mounted within a rigid duct member 30 of suitable diameter to mate with or extend around the end of duct 15 as it enters the container 10. Mounted on duct 30 is a pair of mounting brackets 31 adapted to be affixed to the baffle plate 25. A wire 32 conducts electricity to the motor of fan 26.

Figure 6:
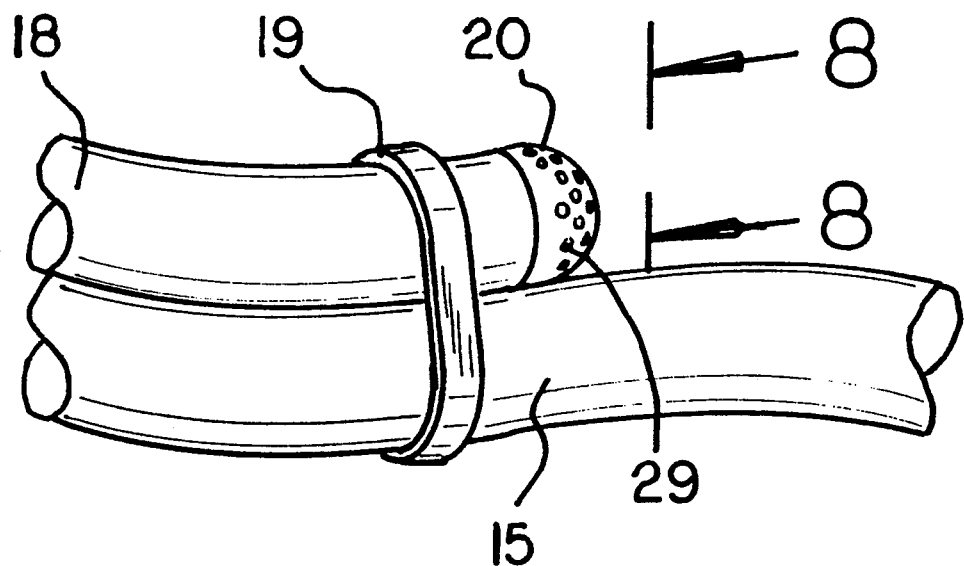
FIG. 6 is an enlarged partial perspective view of the discharge end of the exhaust showing its relationship to the intake duct.
Figure 7:
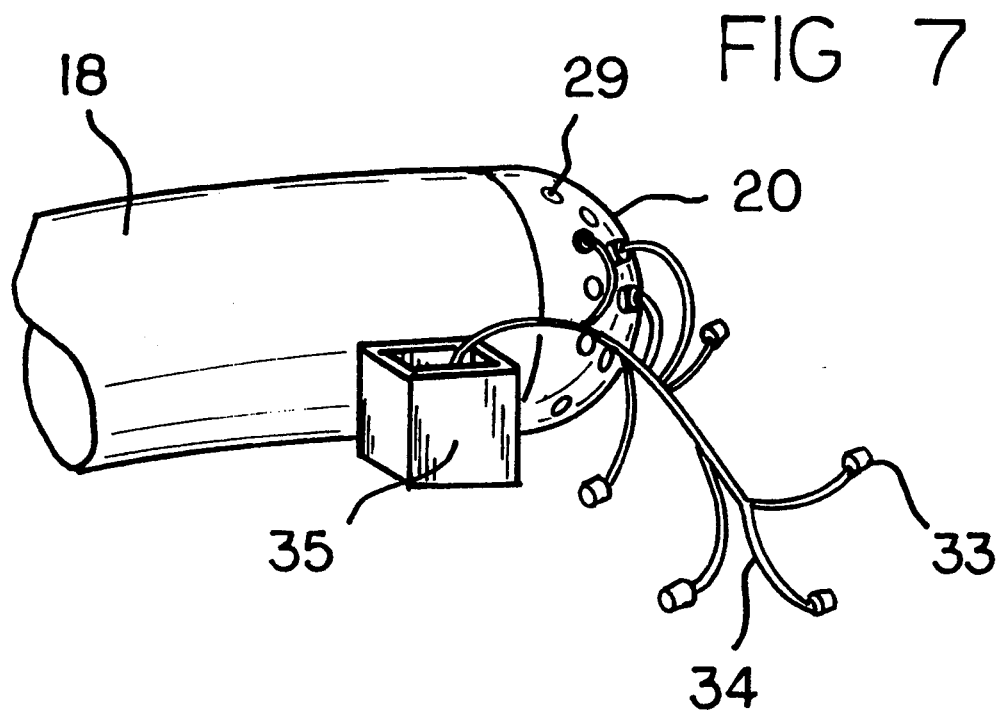
FIG. 7 is an enlarged perspective view of the discharge end shown in FIG. 6 along with the means to control volume and direction of air exhausted therethrough.
Figure 8:
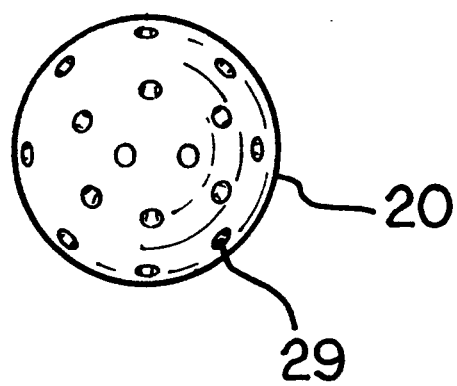
FIG. 8 is a plan view on line 8—8 of FIG. 6.

FIGS. 6, 7 and 8 show the end of exhaust duct 18 in greater detail. FIG. 6 illustrates duct 18 strapped as at 19 to the incoming air duct 15. The end of duct 18 terminates in the perforated cone 20 with a plurality of holes or perforations 29 extending in spaced relationship over the surface thereof. FIG. 8 taken on line 8—8 of FIG. 6 shows an end view of cone 20. FIG. 7 illustrates the use of flexible resilient plugs 33 (sized to fit snugly into holes 29) to selectively close off some of the holes 29 to direct the exhaust air passing therethrough where it may be desired within the vehicle body. These plugs 33 may be formed of rubber, plastic, cork or other resilient material and preferably are provided with flexible cords or fasteners 34 which in turn are secured to duct 18 preferably at and in a storage box 35 which will contain such plugs 33 when not in use.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved mobile cooler comprising:
    an open-interior box insulated on all four sides thereof;
    a flexible air intake duct extending from within said box to the air vent on an automotive air conditioning system;
    means to affix the end of such intake duct to said air vent, said means comprising a plate coupled to said air intake duct and adapted to fit over and engage said air vent to permit fluid communication between said air vent and said air intake duct, and a plurality of flexible fingers extending from said plate, said fingers being operable to extend into spring engagement with vanes of said air vent to secure said plate thereto;
    shelf means within said open-interior box to support perishable food stuffs thereon, said shelf means being positioned intermediate the bottom and top of said box and having an opening in one end thereof, said shelf means being operable to direct air completely across a lower half of said interior of said box, through said opening to an upper half of said interior, and across said upper half of said interior;
    air-directing and accelerating means within said open-interior of said box adjacent the interior end of said air intake duct; and
    a flexible air exhaust duct extending from within said open-interior of said box, said exhaust duct terminating in a perforated member,
    wherein said air directing means comprises an adjustable angle baffle extending into the path of intake air coming through said intake duct, and wherein said air accelerating means comprises a ducted fan in engagement with the interior end of said air intake duct.

2. A mobile cooler as in claim 1 wherein the perforations in said perforated member are spaced from one another over and extending through the surface of said perforated member.

* * * * *